Dec. 3, 1929.  VAN DYKE HILL  1,738,054
MOTION PICTURE FILM
Original Filed June 7, 1929
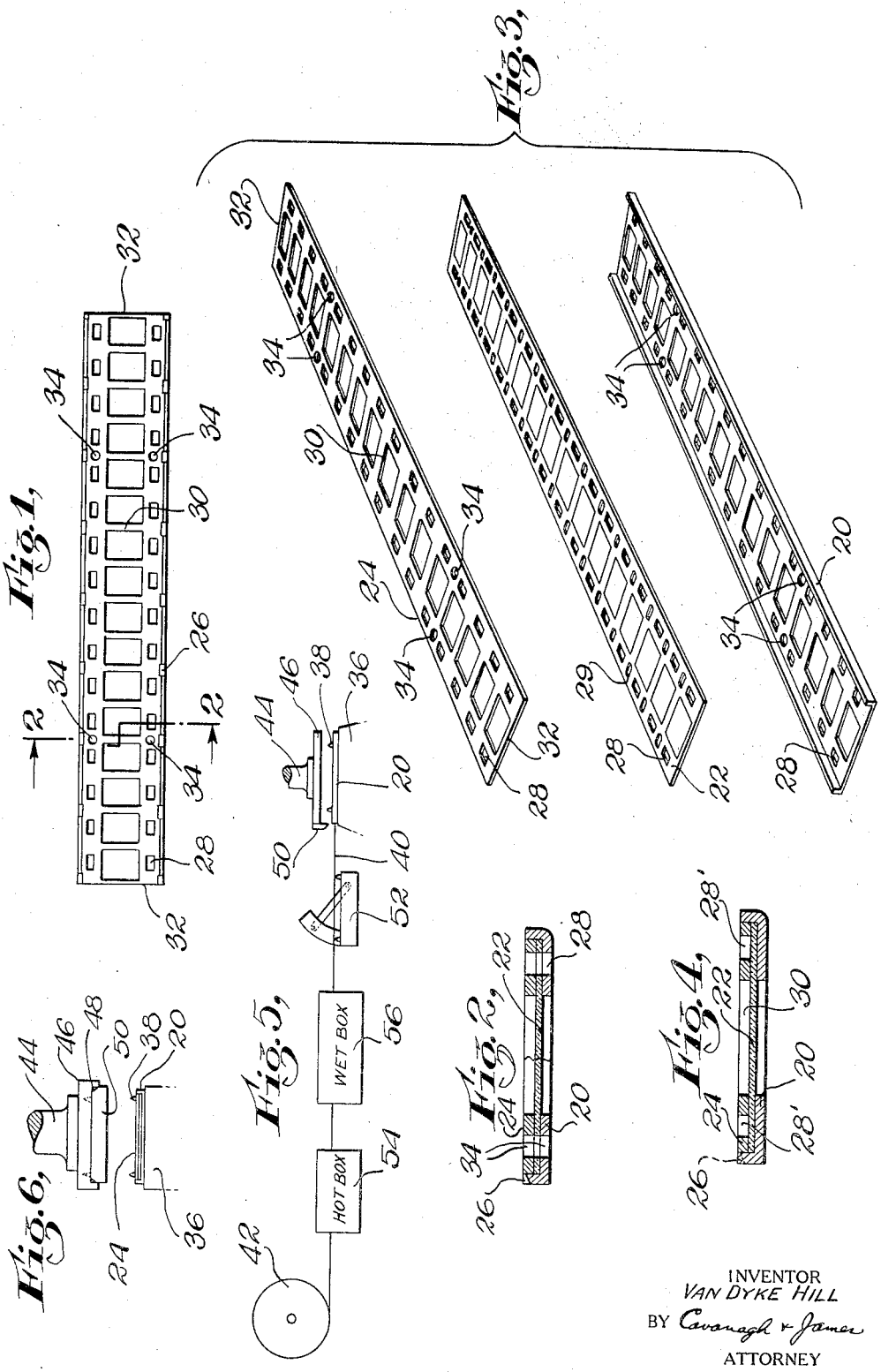
INVENTOR
VAN DYKE HILL
BY Cavanagh & James
ATTORNEY Patented Dec. 3, 1929

1,738,054

UNITED STATES PATENT OFFICE

VAN DYKE HILL, OF SCARSDALE, NEW YORK

MOTION-PICTURE FILM

Original application filed June 7, 1929, Serial No. 369,173. Divided and this application filed August 20, 1929. Serial No. 387,217.

This invention relates to motion picture film, and more particularly to sectionalized film used for the projection of motion pictures.

All motion picture projectors in commercial use, so far as I am aware, utilize a continuous ribbon or strip of celluloid film. Such film undergoes considerable abrasion, scratching, and wear in being run through the projector, and frequently is broken. These difficulties become particularly marked in the case of continuously operated or advertising projectors, for in such projectors the picture displayed seldom exceeds five minutes in duration, and therefore in the course of a few days is run through the projector a great many times oftener than a theatrical film is exhibited during its entire useful life. Furthermore, in the event of film breakage there is no operator immediately available to repair the broken film, as there is in theatres, and consequently the advertising projector must be shut down.

The primary object of my invention is to overcome the foregoing difficulties and to prevent wear and/or breakage of a motion picture film, which I do by dividing the film into sections, and protectively framing each of the film sections, the framed sections being fed past a projector in sequential succession. Each of the sections is preferably made a plurality of pictures in length, say 16 pictures, but they may be single pictures.

In one general aspect my invention comprehends a novel type of motion picture film, which consists of a plurality of film sections each mounted in a frame, the sections preferably being a plurality of pictures in length, and the frames preferably being relatively rigid metallic frames, serving to prevent scratching of the film surface and breakage of the film, and being adapted for feed in end to end succession for the reproduction of the motion picture. A further object of my invention is to initially provide a continuous film in which there is sufficient space between successive pictures to permit of the use of a fairly substantial cross bar on the frames, particularly with a standard size film on which the successive exposures are spaced by the standard amount. Further objects of my invention, considered in this aspect, are the provision of a suitable frame, the provision of a suitable method for loading the film sections into the frame, and more especially for bringing the pictures thereon into registry with the apertures of the frame, while allowing for and preferably controlling the shrinkage and/or stretch of the film due to humidity conditions.

In another general aspect my invention comprehends a suitable motion picture projector for the projection of my novel film. Such a projector preferably comprises a supply magazine for a stack of the framed film sections, projection means, and means to intermittently feed the film sections across the projection means in sequential succession at motion picture speed. In order to make possible continuous operation I provide additional means to return the film sections to the supply magazine, preferably comprising an exhaust magazine for also holding a stack of framed film sections, and conveyor means for transferring said sections from the opposite end of the exhaust magazine back to the opposite end of the supply magazine. This aspect of my invention is described in detail and claimed in my copending application for photographic apparatus, Ser. No. 369,173, filed June 7, 1929, of which the present application is a division, the present application being directed more specifically to my invention in its first aspect.

To the accomplishment of the foregoing and many other objects which will hereinafter appear, my invention consists in the novel film elements, and their relation one to the other, and the method of preparing the same, as hereinafter are more particularly described in the specification and sought to be defined in the claims. The specification is accompanied by a drawing in which:

Fig. 1 is a plan view of a frame or slide for supporting a section of motion picture film;

Fig. 2 is a section taken in the plane of the line 2—2 in Fig. 1;

Fig. 3 shows a film frame in disassembled relationship;

Fig. 4 is a section, similar to that shown in Fig. 2, through an alternative frame or slide;

Fig. 5 is a schematic showing of the method of loading the frames with film; and Fig. 6 is an end elevation of an assembling press utilized in the loading method.

In order to obviate the difficulties arising because of the abrasion and wear on the surface of motion picture films, and the frequent breakage thereof, my invention includes the provision of a novel type of motion picture film consisting of film sections each of which is protectively framed in a relatively rigid and preferably metallic frame. These picture frames are illustrated by and will be described in detail in connection with Figs. 1 through 4 of the drawing, while the method of loading them is illustrated by and will be described in connection with Figs. 5 and 6 of the drawing.

Referring now to Figs. 1, 2, and 3 of the drawing, it will be observed that each of the frames for the film sections consists of a ladder-like metallic strip of channelled cross section, 20, for receiving the film section 22, and a second ladder-like metallic strip 24 of flat cross section, which is adapted to be laid against the other side of the film 22 within the channel walls of the strip 20. The frame members are suitably pressed together, and preferably the channel walls of the bottom member 20 are nicked over upon the top member 24, as at 26, in order to anchor the two ladder-like frame members together and to the film held therebetween.

The frame is provided with spaced apertures, notches, or recesses 28 for engagement by a feeding claw. These apertures need not be, but preferably are, located at the center lines of the pictures, rather than at the center lines of the frame lines between the pictures, as in the case with the standard sprocket holes in, say, a 16 mm. film, such as is commonly used in this type of projector. The opened view in Fig. 3 illustrates the film 22 as being provided with claw apertures 28, which, however, may be made in the film sections after they have been fixed within the frames. The regular sprocket holes are numbered 29.

By the use of an improvement described in detail in my copending divisional application already mentioned, involving magnetic attraction of the frames against the feeding claw of the projector, it is possible to use a very shallow claw recess or indentation, rather than an aperture extending entirely through the frame, as in Figs. 2 and 3. In such case I provide a frame in which only the top member 24 is perforated with feeding apertures, such an arrangement being illustrated in Fig. 4, having the resulting recesses 28', this figure being in other respects similar to the section shown in Fig. 2. This dispenses with the necessity of perforating the lower frame member 20, and the film 22.

In order to form a sturdy protective frame which will hold the film in a secure and non-warping manner, and preferably with sufficient gripping pressure distributed along the film to prevent shrinkage or stretch thereof, I find it desirable to employ fairly substantial cross bars 30. For example, in a 16 mm. film frame 1 make these cross bars $\frac{1}{16}$ of an inch in width. One problem which immediately arises is that of maintaining synchronism or uniform spacing of the pictures on the slides when the slides are fed end to end past the projector. To solve this the end cross bars 32 of the frames are reduced in width, the most simple solution being to make them each equal to one-half the width of the intermediate cross bars 30, or, in the particular case already mentioned, to make them $\frac{1}{32}$ of an inch in width.

Another problem met with is to provide sufficient space between successive pictures on the film to accommodate the cross bars. The usual frame line between pictures is practically negligible in width, being either zero or at most merely a few thousandths of an inch wide. One manner in which I have solved this problem consists in utilizing cross bars having a width equal to the height of the pictures, thereby exposing only alternate pictures to view, at a speed of say 8 per second. The presentation of such a film is not quite as good in quality as might be desired, owing to the reduced picture speed and reduced picture continuity. To restore the quality of presentation it is feasible to take the pictures originally at double speed, and then to use alternate pictures at a speed of say 16 per second in order to obtain proper continuity. However, this method has the disadvantage that only specially produced films may be satisfactorily employed, and it is highly desirable to be able to reproduce for advertising purposes parts of standard motion picture films.

For the foregoing reasons I prefer to employ the type of frame shown in Figs. 1 through 4, and in such case in order to provide the necessary space between successive pictures on the film I reduce the size of the exposures printed on the film without reducing the spacing between the successive exposures. In this manner I may use the usual size positive film, say 16 mm., and print this from a standard size negative film, say 35 mm., or from a 16 mm. film, while spacing the successive exposures on the positive film by the regulation distance. This procedure incidentally reduces the width as well as the height of the individual pictures on the film, but no particular disadvantage results from this other than a slight reduction in the size of the ultimate image on the screen and even this presupposes that no change is made in the projector lens system, for if that is suitably altered the full size image may be restored. If the standard lens system is retained it is merely necessary to use a slightly smaller hood and screen, or the border of the original screen may be masked.

Not only must the metallic frames mate up properly in end to end relation to form a perfectly uniformly spaced series of picture apertures, but also the pictures on the film must be brought into exact registry with the apertures in the frames. To facilitate loading the frames with film while obtaining the desired accurate registry I have devised the following method.

The upper and lower frame members 20 and 24 are provided with pilot holes 34. These pilot holes are preferably located intermediate the ends of the frame, as shown, in order to distribute any slight error in registry due to film shrinkage, and are positioned between pictures, so that they are in alignment with the regulation sprocket holes in the film. In loading the frame the lower frame member 20 is laid on a suitable jig or fixture 36, shown in Figs. 5 and 6, which is provided with four dowel pins or pilots 38. These project through the pilot holes 34, and thereby locate the frame member in position. One end of the film 40 is unreeled from a reel 42 and placed in the frame member 20, the desired registry being secured by the fit of the pilots 38 within the appropriate sprocket holes of the film 40. The upper frame member 24 is then laid over the film, it too being brought into registry by the pilots 38, whereupon the press 44 may be actuated, the die 46 serving to clamp the frame members tightly together and to the film held therebetween. The die 46 is preferably provided with shoulders 48 adapted to form the anchoring nicks 26 in the channel walls of the lower frame member 20 which overlap and bind the upper frame member 24.

In accordance with another feature of my invention, the film 40 is cut off into film sections of the proper length, each flush with the ends of the frame, by a cutting means 50 which operates simultaneously with the die 46. This step of cutting the film after it is loaded incidentally insure that the film sections will be framed in proper sequence.

In spite of all of the foregoing precautions the picture finally projected on the screen may waver or wobble up and down, as though there were imperfect continuity between the successive slides. This I have found is due to the fact that film undergoes considerable shrinkage or stretch, depending on humidity conditions, so that the registration of the pictures from one end to the other end of each frame may vary, depending on the shrinkage of the film at the time it is loaded into the frame. To minimize this error I distribute the pilot holes intermediately and symmetrically in the manner already described.

To obviate it altogether I employ either drying, as by heating, or humidification, or, if desired, a suitable quantitative combination of both, in order to control the shrinkage or stretch of the film at the time it is being loaded into the frames. The frames are designed and made of predetermined dimension, which may include an allowance of say 80 thousandths of an inch per foot for shrinkage. The shrinkage which the film actually possesses at the time it is to be loaded may be measured on a sensitive indicator, schematically shown at 52 in Fig. 5, and, if the shrinkage is not correct, it may be altered by making operative either a hot box 54, or a wet box 56, or even a proper quantitative combination of both at once might be employed. The hot box 54 is simply a means for heating the film, increased dryness serving to increase the shrinkage and decrease the length of the film. The wet box 56 is merely a means for subjecting the film to moisture for humidity control, increased humidity serving to increase the stretch and increase the length of the film. When these have been adjusted to obtain the desired predetermined film dimension, so that the film will exactly fit the frames, the film is loaded into and securely clamped by the frames. At occasional intervals the film may be tested by the indicator 52 in order to check the film dimension to see if it still is of the proper amount.

From the foregoing description the numerous advantages and the mode of preparation of my improved motion picture film will for the most part be apparent. The film is not subject to breakage because it is sectionalized already, and is not scratched and worn during use because the frictional engagement of the film with the track of the projector is taken entirely by the metal surface of the metallic frames, the film itself being spaced away from the track and from any other surface which might injure it. The frames are relatively sturdy and rigid and yet may be manufactured economically and loaded with ease and rapidity. The space for the frame cross bars is provided between successive pictures while employing film of customary size. The pictures are located with great accuracy relative to the picture spaces in the frames due to the use of the appropriately located pilot holes and due to the control of the stretch or shrinkage of the film.

While many features of my invention are applicable to single picture frames it will be appreciated that there is considerable advantage in making each of the frames a plurality of pictures long, for this enhances the smoothness of operation and the continuity of picture presentation. It also permits of a more rigid frame, the cross bars being double the width that they would be in equivalent sized single picture frames. It is far easier to load the frames with film, and fewer operations are required for so doing. The resulting frames and stacks of frames are easier to handle. Furthermore, the magazines for holding the stacks of frames are made more compact in size. In the present case, for example, there being 16 pictures in each frame the frames are used at the rate of one per second, 240 frames being required for a picture of four minutes duration. Obviously, with single picture frames the stacks of frames would have to be 16 times as high, and undoubtedly would prove to be at least very inconvenient to house, to handle, and so on.

It will be apparent that while I have shown and described my invention in the preferred form, many changes and modifications may be made in the structure and in the method disclosed without departing from the spirit of the invention, defined in the following claims.

I claim:

1. In the manufacture of framed film, the method which includes making the frame of proper size for a predetermined film dimension, controlling the dimension of the film to be the predetermined amount by varying the humidity of the film, loading the film into the frame while the film dimension is the predetermined amount, and fixing the film and frame together.

2. In the manufacture of framed sectional film, the method which includes making the frames of predetermined dimension, drying the film in order to adjust the dimension thereof to the predetermined value, and fixing the film and frames together while the film dimension is the predetermined value.

3. In the manufacture of framed sectional film, the method which includes making the frames of predetermined dimension, humidifying the film in order to adjust the dimension thereof to the predetermined value, and fixing the film and frames together while the film dimension is the predetermined value.

4. In the manufacture of framed sectional film, the method which includes making the frames of predetermined dimension for receiving a desired plurality of film pictures, applying humidity control to the film in order to adjust the length of equivalent portions thereof containing the desired plurality of pictures to the predetermined dimension, and fixing the film and frames together while the film dimension is the predetermined value.

5. A motion picture film consisting of a plurality of film sections, a uniform plurality of pictures in length each framed in a metallic frame, said frames serving to prevent scratching of the film surface and breakage of the film, and the adjacent ends of successive frames being so mated together that the frames may be fed with a uniform feeding movement in end to end succession for the reproduction of the motion picture.

6. A motion picture film consisting of a plurality of film sections each a plurality of pictures in length and each framed in a relatively rigid metallic frame, said frames serving to prevent abrasion of the film surface and breakage of the film, and the adjacent ends of successive frames being so located relative to the end pictures of the frames that the frames may be pushed with a uniform feeding movement in end to end succession for the reproduction of the motion picture.

7. A film frame comprising a ladder-like metallic strip of channelled cross section for receiving the film, a second ladder-like metallic strip of flat cross section adapted to be laid against the other side of the film within the channel walls, the channel walls thereafter being pressed to anchor the two ladder-like frame members together with the film held therebetween, at least one of the strips of said frame being provided with uniformly spaced claw apertures for feeding engagement by a feeding claw.

8. A sectionalized motion picture film including a plurality of film frames each comprising a ladder-like strip for receiving the film, a second ladder-like strip adapted to be laid against the other side of the film, said strips each comprising longitudinal members and cross-bars extending transversely therebetween, the adjacent end cross-bars of the successive frames being suitably reduced in width to maintain synchronism when the frames are fed in end to end succession.

9. A film frame comprising a ladder-like strip of channelled cross section for receiving the film, a second ladder-like strip of flat cross section adapted to be laid against the other side of the film within the channel walls, the channel walls thereafter being pressed to anchor the two ladder-like frame members together with the film held therebetween, the end cross-bars of the frame being suitably reduced to maintain synchronism when the frames are fed in end to end succession, at least one of the strips of said frame being provided with uniformly spaced claw apertures for feeding engagement by a feeding claw.

10. A film frame comprising a ladder-like metallic strip for receiving the film, and a second ladder-like metallic strip adapted to be laid against the other side of the film, said frame being provided with uniformly spaced claw recesses out of register with the sprocket holes of the film, and with additional pilot holes properly located to register with the sprocket holes of the film.

11. A film frame comprising a ladder-like metallic strip of channelled cross section for receiving the film, a second ladder-like metallic strip of flat cross section adapted to be laid against the other side of the film within the channel walls, the two ladder-like frame members being anchored together with the film held therebetween, the end cross-bars of the frame being suitably reduced to maintain synchronism when the frames are fed in end to end succession, said frame being provided with uniformly spaced claw recesses and with pilot holes properly located to register with the sprocket holes of the film.

12. A film frame comprising a ladder-like strip of channelled cross section for receiving the film, a second ladder-like strip of flat cross section adapted to be laid against the other side of the film within the channel walls, the channel walls thereafter being pressed to anchor the two ladder-like frame members together and to the film held therebetween, the end cross-bars of the frame being suitably reduced to maintain synchronism when the frames are fed in end to end succession, at least one of the strips of said frame being provided with uniformly spaced claw apertures for feeding engagement by a feeding claw, and being made of magnetic material.

13. A sectionalized motion picture film including a plurality of film frames each comprising a ladder-like strip for receiving and protectively framing the film, said strips each comprising longitudinal members and cross-bars extending transversely therebetween, the adjacent end cross-bars of the successive frames being suitably reduced in width to maintain synchronism when the frames are fed in end to end succession.

14. A film frame comprising a ladder-like metallic strip for receiving and protectively framing the film, said frame being provided with uniformly spaced feed recesses out of register with the sprocket holes of the film and with additional markers properly located to register with the sprocket holes of the film.

15. A sectionalized motion picture film including a plurality of film frames each comprising a ladder-like strip for receiving and protectively framing usual size film, said strips each comprising longitudinal members and cross-bars extending transversely therebetween in order to form picture framing apertures, the spacing of the apertures being the usual amount, the spacing of the exposures printed on the film being also the corresponding usual amount, the exposures on the film being slightly reduced in size in order to provide sufficient space between successive pictures for the cross-bars of the frame, and the end cross-bars of the frames being so located relative to the end pictures that when the frames are placed end to end the spacing of the adjacent end pictures is also the usual amount.

Signed at New York in the county of New York and State of New York this 19th day of August, A. D. 1929.

VAN DYKE HILL.